United States Patent
Dobier et al.

(10) Patent No.: US 10,657,320 B1
(45) Date of Patent: May 19, 2020

(54) AUTOMATIC DYNAMIC GENERATION OF ELECTRONIC FORMS USING FORM DEFINITION, DOCUMENT METADATA AND SUPPLEMENTAL METADATA

(71) Applicant: Wells Fargo Bank, N.A., San Francisco, CA (US)

(72) Inventors: Darren James Dobier, Stillwater, MN (US); Toby Jason Peecher, Maricopa, AZ (US); Randall Howard Flory, Colorado Springs, CO (US); Abraham Drucker, San Francisco, CA (US); Anita Sukur, Minneapolis, MN (US); Bhanu Sankaran, Fremont, CA (US); Himanshu G. Patel, Fremont, CA (US); Rui Fan, Dallas, TX (US); Ravi K. Maganti, Minneapolis, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 15/015,825

(22) Filed: Feb. 4, 2016

Related U.S. Application Data

(60) Provisional application No. 62/112,042, filed on Feb. 4, 2015.

(51) Int. Cl.
*G06F 40/174* (2020.01)
*G06F 40/14* (2020.01)

(52) U.S. Cl.
CPC ............ *G06F 40/174* (2020.01); *G06F 40/14* (2020.01)

(58) Field of Classification Search
CPC ............................ G06F 17/243; G06F 17/2247
USPC ........................................ 715/221, 222, 223
See application file for complete search history.

(56) References Cited

U.S. PATENT DOCUMENTS

| | | | | |
|---|---|---|---|---|
| 8,121,946 | B1* | 2/2012 | Arguello | G06Q 20/102 705/38 |
| 8,352,272 | B2* | 1/2013 | Rogers | G10L 13/00 704/266 |
| 8,433,650 | B1* | 4/2013 | Thomas | G06Q 10/06 705/35 |
| 8,972,868 | B2* | 3/2015 | Schubert | G06Q 10/06 715/751 |
| 9,483,461 | B2* | 11/2016 | Fleizach | G10L 13/033 |
| 2002/0115051 | A1* | 8/2002 | Sanda | G09B 5/00 434/350 |
| 2002/0194219 | A1* | 12/2002 | Bradley | G06F 17/243 715/223 |
| 2006/0288283 | A1* | 12/2006 | Schrepp | G06F 9/4443 715/700 |
| 2009/0276839 | A1* | 11/2009 | Peneder | G06F 21/31 726/8 |

(Continued)

OTHER PUBLICATIONS

"Dynamic;" Webopedia; Oct. 13, 2014; webopedia.com; pp. 1-2.*

*Primary Examiner* — Andrew R Dyer
(74) *Attorney, Agent, or Firm* — Merchant & Gould P.C.

(57) ABSTRACT

An eForm system includes defining an eForm, defining document metadata associated with the eForm, and defining supplemental metadata associated with the eForm. In response to a document generation request, the eForm definition, the associated document metadata, and the associated supplemental metadata are assembled. In response to a document display request, an eForm display is generated based on the eForm definition, the associated document metadata, and the associated supplemental metadata.

7 Claims, 8 Drawing Sheets

(56) References Cited

U.S. PATENT DOCUMENTS

| | | | |
|---|---|---|---|
| 2012/0158573 A1* | 6/2012 | Crocker | G06Q 40/02 |
| | | | 705/38 |
| 2013/0104029 A1* | 4/2013 | Hendry | G06F 17/2247 |
| | | | 715/234 |
| 2013/0204645 A1* | 8/2013 | Lehman | G06Q 40/08 |
| | | | 705/4 |
| 2013/0311169 A1* | 11/2013 | Khan | G06F 17/2785 |
| | | | 704/9 |
| 2014/0089772 A1* | 3/2014 | Shetty | G06F 17/3089 |
| | | | 715/206 |
| 2014/0129457 A1* | 5/2014 | Peeler | G06Q 10/067 |
| | | | 705/317 |

* cited by examiner

1. Select the Preferred Payment Plan option that matches your pay schedule

Check the appropriate box to mark your choice. If this form is signed, but no option is checked, you will be set up for monthly withdrawals on your due date.

Note: If you choose the weekly or every-other-week option, withdrawals in addition to the amount needed to cover your monthly mortgage payments will naturally occur 2 to 5 times per year. The additional withdrawn funds will be automatically applied to your principal balance - helping you pay off your mortgage faster.

☐ Weekly: One-quarter of your monthly payment is withdrawn every week, including principal, interest, applicable tax and insurance payments. In a year's time, 52 withdrawals will be made.

Request a withdrawal start date (must be Monday-Friday and 4 weeks prior to due date): _____

☐ Biweekly (every other week): Half of your monthly payment amount will be withdrawn every other week, including principal, interest, applicable tax and insurance payments. In a year's time, 26 withdrawals will be made.

1. Select the Preferred Payment Plan option that matches your pay schedule

Check the appropriate box to mark your choice. If this form is signed, but no option is checked, you will be set up for monthly withdrawals on your due date.

Note: If you choose the weekly or every-other-week option, withdrawals in addition to the amount needed to cover your monthly mortgage payments will naturally occur 2 to 5 times per year. The additional withdrawn funds will be automatically applied to your principal balance - helping you pay off your mortgage faster.

☒ Weekly: One-quarter of your monthly payment is withdrawn every week, including principal, interest, applicable tax and insurance payments. In a year's time, 52 withdrawals will be made.

Request a withdrawal start date (must be Monday-Friday and 4 weeks prior to due date): 03/04/2016

☐ Biweekly (every other week): Half of your monthly payment amount will be withdrawn every other week, including principal, interest, applicable tax and insurance payments. In a year's time, 26 withdrawals will be made.

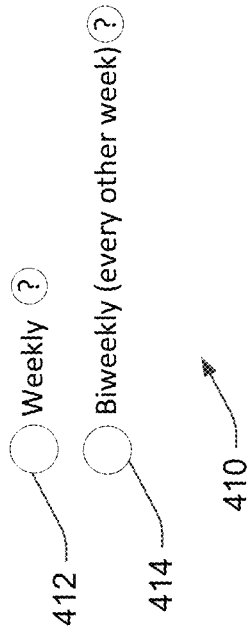

AUTOMATIC DYNAMIC GENERATION OF ELECTRONIC FORMS USING FORM DEFINITION, DOCUMENT METADATA AND SUPPLEMENTAL METADATA

BACKGROUND

Manually completing forms is a time consuming activity that presents opportunities for data entry errors. An electronic form, or "eForm," is a digital form that may mimic a paper form or consist of a traditional web form where supplied data is populated in a document upon submission. The use of eForms has increased significantly, especially in form-intensive industries such as banking, tax preparation, insurance, etc. to reduce the amount data entry errors, decrease time to completion, reduce mailing expense, reduce rekeying of data in downstream processes, enable the tracking of documents, meet customer expectations, provide additional help/assistance, etc. Among other things, the use of eForms can facilitate less repetitive manual data entry by pre-populating form fields, provide error checking routines, and generally simplify the process of completing form.

Further, eForms are often static in nature. Certain fields on such static forms may not apply to every situation in which the eForm is employed, or the particular fields required may vary depending on circumstances such as previous answers. Flexibility is sometimes provided by writing specialized software code and logic to define eForm inputs, though such coding processes can be expensive and time consuming, and are not easily modified.

SUMMARY

In accordance with aspects of the present disclosure, an eForm system includes defining an eForm, defining document metadata associated with the eForm, and defining supplemental metadata associated with the eForm. In response to a document generation request, the eForm definition, the associated document metadata, and the associated supplemental metadata are assembled. In response to a document display request, an eForm display is generated based on the eForm definition, the associated document metadata, and the associated supplemental metadata.

BRIEF DESCRIPTION OF THE DRAWINGS

FIG. 7 is an excerpt of a eForm user interface display.

FIG. 8 is another view of the excerpt of the eForm user interface display shown in FIG. 7.

FIG. 9 is an excerpt of a eForm user interface display.

FIG. 10 is another view of the excerpt of the eForm user interface display shown in FIG. 9.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense.

Many processes, such as those related to loan applications and financial transactions, require a user to fill out forms. Often, the various forms required, as well as the particular information required on a given form can change depending on the particular transaction or situation. Moreover, many situations require completion and delivery of forms within strict deadlines. Thus, using static, predefined forms may not meet requirements in certain situations, even if the user is completing the electronic documents or forms ("eDocuments," "eForms") via an online or other computer-based process and signing the forms electronically ("eSignature"). Generally, an eDocument or eForm is electronic media content that may be used in either an electronic form or as printed output.

Such eForms may be based on a Portable Document Format ("PDF"), which allows defining and presenting documents in a manner independent of specific application software, hardware, and operating systems. Such PDF documents include a description of a document, including the text, fonts, graphics, and other information needed to display it. However, some document generation systems may not be able to adequately define all the desired document attributes. Thus, in some example systems and processes disclosed herein, eForms containing form objects that require completion by an eSignature participant are dynamically generated based on product type, product metadata, legal/compliance/regulatory requirements, and process data contained.

Some form fields may be prepopulated based on known or previously provided information. The particular form fields that are prepopulated typically vary from transaction to transaction. As a result, objects, object attributes, metadata, and generated HTML, display, and validations must be able to dynamically adjust. Further, these eForms are generated for presentation and completion on a wide variety of computer platforms, such as desktop, laptop, tablet, smartphone devices, etc. Online presentation of these eForms is accomplished by translating the attributes defined in the dynamically generated PDF and accompanying metadata into HTML data in some implementations.

Figure 1:
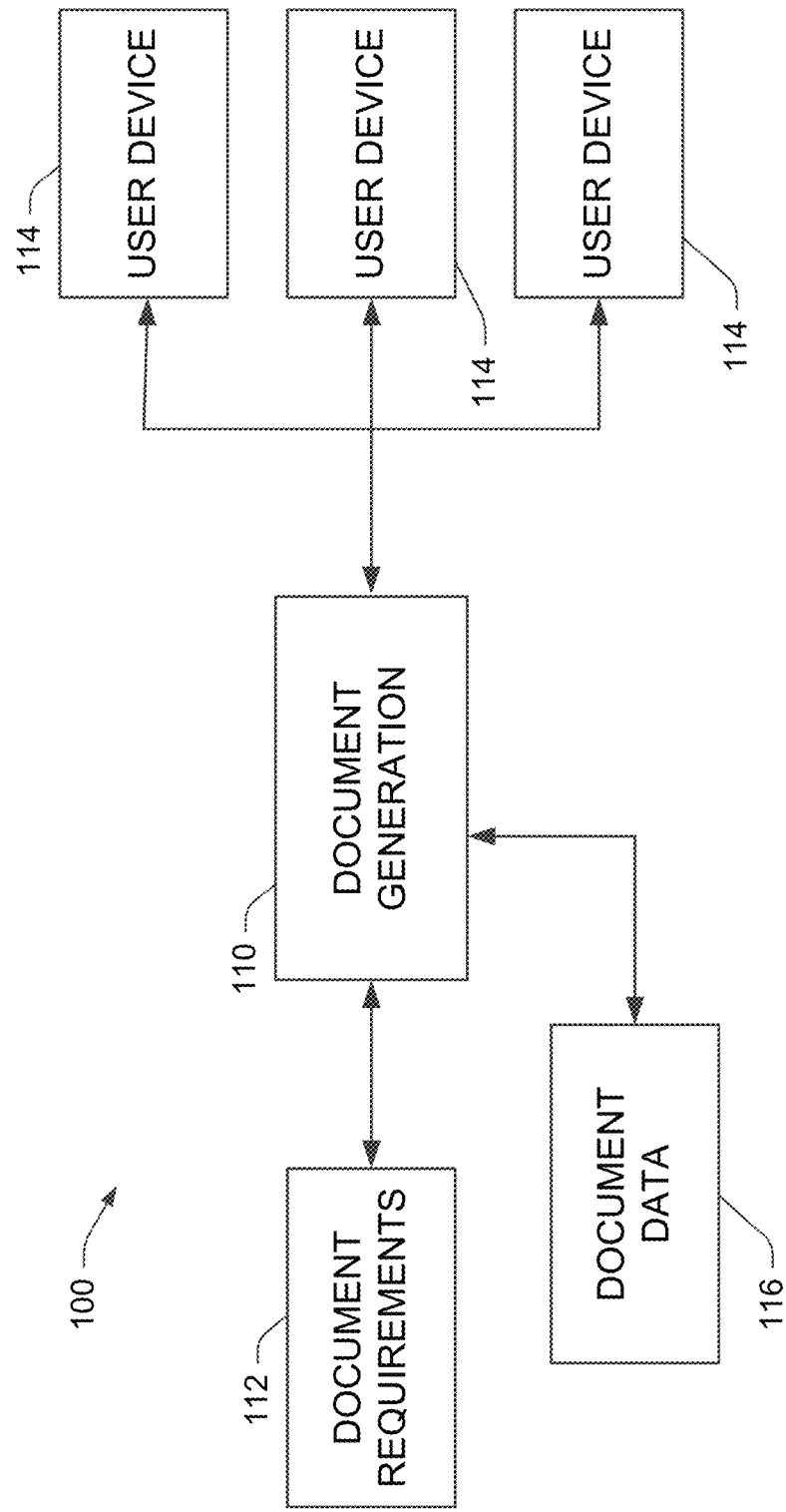
FIG. 1 generally illustrates an example of a document system in accordance with aspects of the present disclosure.

FIG. 1 is a block diagram generally illustrating aspects of an example document system 100 in accordance with the present disclosure. A document generation engine 110 receives document requirements 112 from various sources, and based thereon, dynamically generates and formats eForms for presentation to a user. The user may view and provide the information necessary to complete the eForms using desired devices 114 such as personal computers, laptops, tablet computers, and smart phones for example. In some example systems, the document generation engine 110 communicates with other devices or data sources to obtain document data 116 for pre-filling portions of the generated forms.

In some examples, the document system 100 includes one or more computing devices, each including a processing unit and computer readable media. For instance, the document generation engine 110 may be implemented on a server device that interfaces with various other systems (other servers, computers, tablets, smart phones, databases, etc.) to receive the document requirements 112, and to present documents on the user devices 114. Computer readable media includes physical memory such as volatile memory (such as RAM), non-volatile memory (such as ROM, flash memory, etc.) or some combination thereof. Additionally, the document system 100 can include mass storage (removable and/or non-removable) such as a magnetic or optical disks or tape. An operating system, such as Linux or Windows, and one or more application programs can be stored on the mass storage device. The system 100 can include various input devices (such as a keyboard and mouse, touch screen, etc.) and output devices (such as a monitor and printer). The system 100 can also include network connections to other devices, computers, networks, servers, etc.

In example embodiments, various computing devices of the document system 100 can communicate with one another through one or more networks, such as a local area network (LAN), a wide area network (WAN), the Internet, or a combination thereof. Communications can be implemented using wired and/or wireless technologies. In example embodiments, the system 100 includes one or more web servers that host one or more web sites that are accessible from the network(s).

For example, in some embodiments, the user devices 114 include a browser running on a computing device to access information from the document generation engine 110. The user devices 114 can view documents from the document generation engine 110, and further provide and obtain information required to complete the displayed documents.

Figure 2:
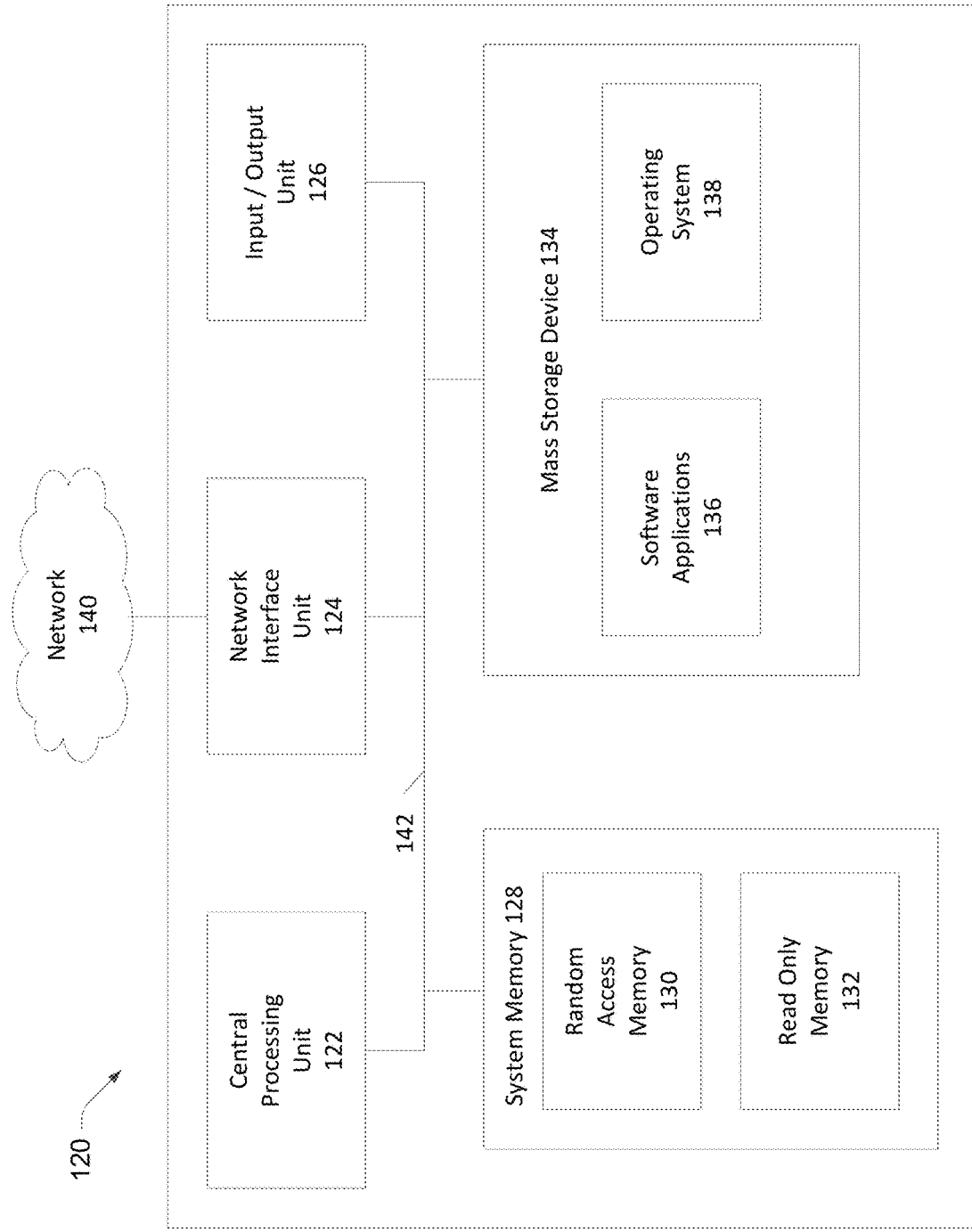
FIG. 2 is a block diagram illustrating portions of an example computer system suitable for implementing elements of the system shown in FIG. 1.

FIG. 2 schematically illustrates an example of a computer system 120 suitable for implementing elements of the document system 100 shown in FIG. 1, including the document generation engine 110 and/or user devices 114. As noted above, in some implementations, the document generation engine 110 is implemented via a server computer 120, for example, at a financial institution. The computer 120 includes at least one central processing unit ("CPU") 122, a system memory 128, and a system bus 142 that couples the system memory 128 to the CPU 122. The system memory 128 includes a random access memory ("RAM") 130 and a read-only memory ("ROM") 132. A basic input/output system that contains the basic routines that help to transfer information between elements within the server computer 120, such as during startup, is stored in the ROM 132. The computer 120 further includes a mass storage device 134. The mass storage device 134 is able to store software instructions and data. The document requirements 112 and/or document data 116 could be stored by the mass storage device 132, or they could be implemented by other computer systems accessible by the computer 120.

The mass storage device 134 is connected to the CPU 122 through a mass storage controller (not shown) connected to the system bus 142. The mass storage device 134 and its associated computer-readable data storage media provide non-volatile, non-transitory storage for the server computer 120. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 120.

According to various embodiments of the invention, the server computer 120 may operate in a networked environment using logical connections to remote network devices through the network 140, such as a wireless network, the Internet, or another type of network. The server computer 120 may connect to the network 140 through a network interface unit 124 connected to the system bus 142. It should be appreciated that the network interface unit 124 may also be utilized to connect to other types of networks and remote computing systems. The server computer 120 also includes an input/output controller 126 for receiving and processing input from a number of other devices. Similarly, the input/output controller 126 may provide output to various types of output devices.

As mentioned briefly above, the mass storage device 134 and the RAM 130 of the server computer 120 can store software instructions and data. The software instructions include an operating system 138 suitable for controlling the operation of the server computer 120. The mass storage device 134 and/or the RAM 130 also store software instructions, that when executed by the CPU 122, cause the server computer 120 to provide certain functionality of the document system 100 discussed in this disclosure, including elements such as the document generation engine 110.

In certain embodiments, the system 100 provides the ability to electronically deliver documents to end users for review and completion in a secure audited environment. For example, this may reduce data errors and processing time, while the electronic delivery of various documents may decrease the time required to complete the process associated with the generated forms, such as a loan or mortgage application. Among other things, the system 100 allows end users to electronically update and/or edit user-entered data on forms delivered. Further, some systems provide electronic signature ("eSign") capabilities. In such systems, disclosed systems may further provide for user's eSign within required time frames.

Figure 3:
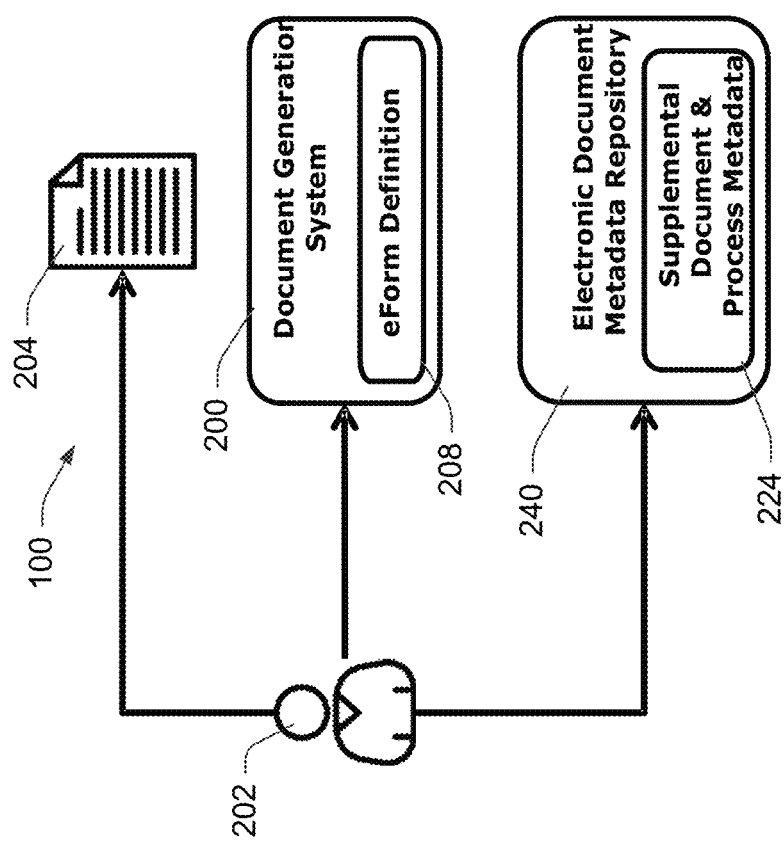
FIG. 3 is a block diagram illustrating aspects of an example of an eForm system and process in accordance with the present disclosure.

FIG. 3 illustrates further aspects of the example system 100. A document generation system 200, which may be implemented by the example computer system 120 shown in FIG. 2, receives an eForm definition that is created by a document administrator 202. In some implementations, all forms associated with a particular process, such as a home mortgage application, are generated. Particular embodiments provide functionality such as cross validation of edits, customer correction of data (as applicable), in-document customer instruction and updating form verbiage content when necessary through static PDF documents and/or dynamically created eForms supplemented with additional metadata.

In the illustrated example, the document administrator 202 manually creates a static document 204, which may be a typical PDF form. The static document 204 is suitable for printing out by a user for manual completion or may include predefined user-fillable fields for computer-based completion. In the illustrated system 100, the document administrator may further create a dynamic eForm, which is a dynamic document enhanced for online display and completion. Accordingly, the document administrator 202 may define an eForm definition 208 using the document generator 200 for dynamically generating desired documents. In some embodiments, the eForm definition 208 is a PDF document description, defining form elements such as text boxes, drop down lists, control elements, etc. for user inputs. The eForm definition 208 may be stored in a memory accessible by an appropriately programmed processor.

Additionally, supplemental metadata 224 associated with the eForm is defined by the system administrator 202. The supplemental metadata 224, for example, provides additional information to provide a desired customer experience associated with online presentation and completion of the eForm. The supplemental metadata could include data needed to orchestrate and define the online process, data required to present a documents in a clear, concise, and customer friendly manner that cannot be provided by the document generation system 200 or the PDF eForm definition 208 and thus needs to be defined externally to those systems in then integrated into the process. The supplemental metadata 224 is maintained in an electronic document metadata repository 240, which may include suitable computer memory such as that illustrated in FIG. 2.

Figure 4:
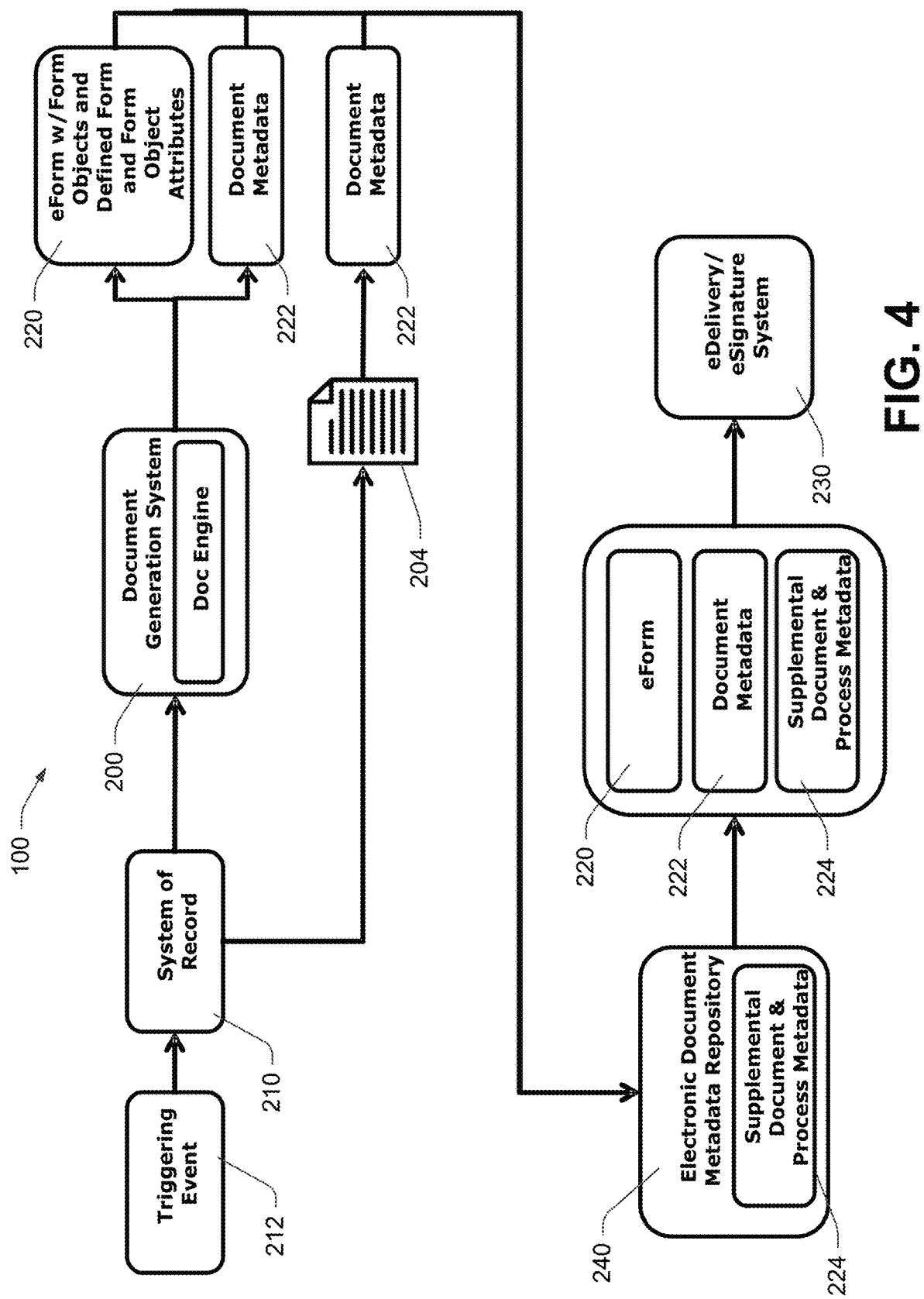
FIG. 4 is a block diagram illustrating further aspects of an example of an eForm system and process in accordance with the present disclosure.

FIG. 4 illustrates further aspects of the system 100, including an example eForm generation process. Some information required for dynamically generated eForms including form objects that require completion by an eSignature participant may be contained within a system of record ("SOR") 210, such as a loan origination system. In response to a document generation request 212, or "triggering event" such as a request for a loan application, the SOR 210 generates a request that is received by the document generation system 200. In response thereto, the document generation system 200 dynamically generates the eForm 220 containing, for example, text and form objects that in some instances must be tagged for accessibility according to the Americans with Disabilities Act ("ADA"). eForms are generated based on the templates, and in some examples, the eForms are generated as PDF documents such as ADOBE PDF files.

In some situations, a single predefined document may be used in various different processes. For example, a given form may be used in applications for different types of loan products. However, some fields within that form may require data inputs for some loan products, while other products use different form fields. As discussed in conjunction with FIG. 1, data may be available to pre-fill some form fields. However, in some circumstances, a user is required to complete certain form fields even if information is available for that field. Thus, rather than simply assemble one or more predefined PDF documents, the document generation system 200 dynamically generates the necessary eForms and eForm user interface displays to meet the needs specified by the SOR 210.

Ultimately, an eForms display is generated for online presentation to a user via an eDelivery and eSignature system 230. In addition to translating attributes defined in PDF eForms 220 dynamically generated by the document generation system 200, development of the eForms display for online presentation to a user includes incorporating document metadata 222 associated with the eForm 220. The document metadata 222 may include, for example, data needed to orchestrate/define the online process or data needed to present a documents in a clear, concise, and customer friendly manner that can be provided by the system of record 210 or the document generation system 200.

When the eForm 220 is generated by the document generation system 200 based on the eForm definition 208, the associated document metadata 222 are also dynamically generated. In the example shown in FIG. 4, document metadata 222 are generated by the document generation system 200, which is then assembled together with the supplemental process metadata 224 contained in the electronic document metadata repository 240. The document metadata 222 and supplemental metadata may define, for example, Form object types (textbox, checkbox, dropdown, radio button, etc.)
Datatypes (string, numeric, floating, boolean, etc.)
Form and field validations (required/not required, length, format, etc.).
Cross field validations based on rules defined at doc generation event and based on participant data entry
Participant rights (who can complete which fields)
Form field objects and signature/initial relationships
Form and individual field online help text
Form object and instructional text with accompanying display order metadata The eForms (PDF documents) 220, as well as the document and supplemental metadata 222, 224 are provided to the eDelivery and eSignature system 230. In the example illustrated in FIG. 4, the static form 204 and its associated document metadata 222 are also provided to the eDelivery and eSigature system 230. Some eForms processes have particular criteria for secure electronic delivery and electronic signatures. The eDelivery/eSignature system 230 incorporates these secure processes with the generated forms and metadata where required.

Figure 5:
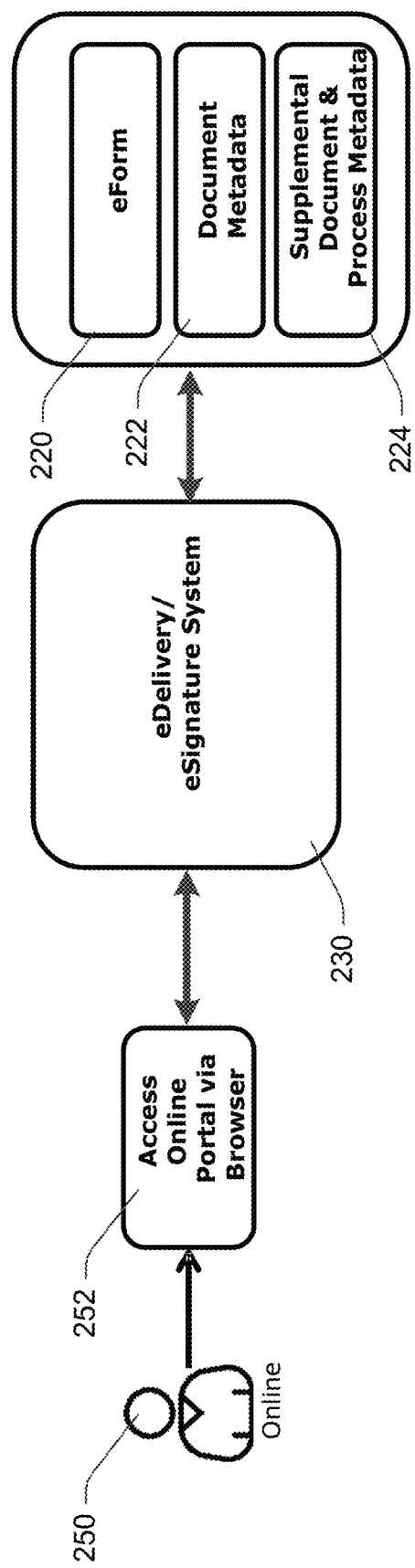
FIG. 5 is a block diagram illustrating further aspects of an example of an eForm system and process in accordance with the present disclosure.

FIG. 5 illustrates further aspects of the system 100, including a document request process in which a user 250 makes a document request via a user interface 252 such as an online portal displayed on a web browser. The user interface 252 may be generated by the eDelivery and eSignature system 230 (implemented by the server computer 120) and displayed on a user device 114 (as shown in FIG. 1) that communicates with the document generation system 100 over a network such as the internet. In response to the document request, the eForms 220, associated document metadata 222, and the supplemental metadata 224 are provided to the eDelivery and eSignature system 230, which provides an eForm display on the user interface 252 that allows the user 250 to view, complete and submit the eForm.

Figure 6:
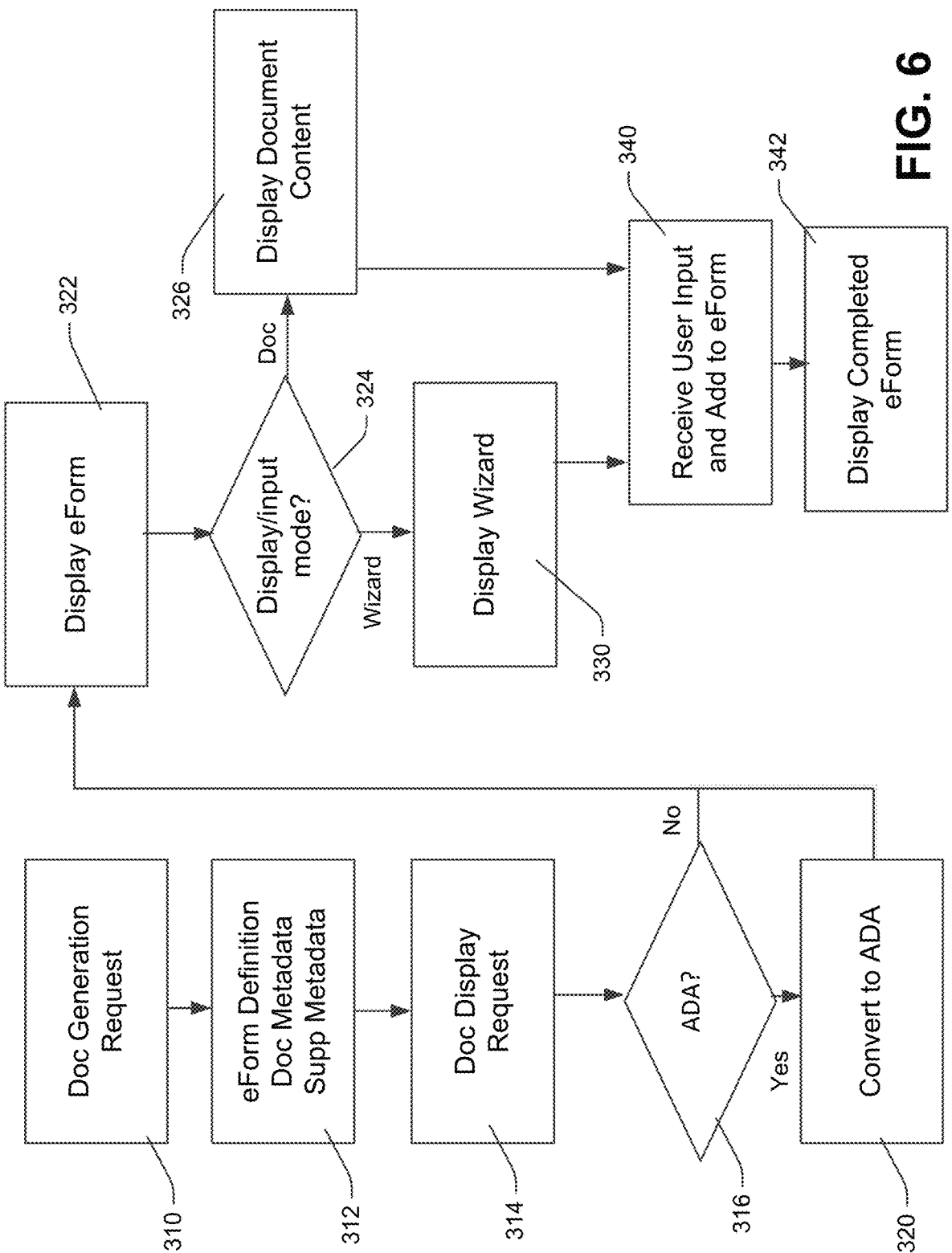
FIG. 6 is a flow diagram illustrating further aspects of an example of an eForm system and process in accordance with the present disclosure.

FIG. 6 illustrates an example of a process for generating and viewing eForms in accordance with further aspects of the disclosed system. As noted above, in response to a document generation request 310, an eForm definition, associated document metadata, and associated supplemental metadata are defined by a document administrator and stored. In the example shown in FIG. 3, the eForm definition and its associated metadata are stored by the document generation system 200, and the supplemental metadata are stored in the electronic document metadata repository 240 in block 312 of FIG. 6.

In response to a document display request 314, or triggering event such as a loan application request, the SOR 210 identifies the required documents, and also may provide available information to prefill appropriate eForm fields. The document generation system outputs the proper eForms 220, document metadata 222 and associated metadata 224 to the eDelivery and eSignature system 230.

If necessary or required, the system 100 may adapt the eForms to make them compliant with requirements of the ADA. For instance, the PDF documents and associated form objects, metadata, etc. may be tagged for accessibility during the document generation process and then those tags are processed and translated into accessible HTML, allowing use of text reading technology for visually impaired users. Thus, in some implementations, the user indicates whether an ADA display of the data is required at block 316. If an ADA display is requested, the eForm is converted to an ADA format 320 that is more compatible with an ADA display system, such as accessible HTML for use with text reading technology.

The eForm is displayed on the user interface by the electronic document metadata repository 240 as indicated at block 322. In some embodiments, introductory information is provided along with the eForm. Prefilled fields may be displayed along with fields requiring user input. FIG. 7 shows an example of a portion of an eForm display, depicting an area of an eForm 400 requiring user input. The illustrated excerpt 400 includes a "weekly" checkbox 402 where a user can choose a weekly payment plan option, and a biweekly checkbox 404 where a user can choose a biweekly payment plan option.

In block 324, the user can indicate a desired mode for providing the required eForm user inputs. In the illustrated implementation, the user may select between a "wizard view and a "document content view" in block 324. The document content view allows the user to view and input information into a form that replicates the underlying eForm document. If the user selects the document content view mode, a display such as the excerpt 400 shown in FIG. 7 is provided in block 326, and the user may select the desired checkbox. FIG. 8 illustrates the eForm document excerpt 400 where the "weekly" checkbox 400 has been selected by the user.

If the user selects the wizard mode in block 324, the user interface 252 generated by eDelivery and eSignature system 230 dynamically generates an alternate eForm display by applying the eForm definition 220, document metadata 222 and supplemental metadata 224 to server based rules to translate the PDF forms to an appropriate format for online presentation. In some examples, the eDelivery and eSignature system 230 applies the rules to generate dynamic HTML and JAVASCRIPT for creation of the "wizard" display indicated at block 330. In this manner, eForm display and user input displays are dynamically generated with form objects, form attributes, form object attributes, additional metadata, etc., and may be further supplemented with business rules/logic/information, and then translated into web based formats using HTML, JAVASCRIPT and server-side code, for example.

FIG. 9 shows an excerpt from a wizard user interface 410 for receiving the user's input for the completing the portion of the eForm 400 shown in FIG. 7. However, rather than directly interacting with the checkboxes shown in the PDF eForm as illustrated in FIG. 8, the user interface excerpt 410 shown in FIG. 9 provides an alternative interface in which the user can indicate a selection for the weekly payment plan option 412 or the biweekly payment plan option 414. If the user desires additional information, they may select the help indicator ("?" symbol) to obtain further information. This additional information may be defined, for example, as part of the supplemental metadata 224.

FIG. 10 shows the excerpt 410 where the user has selected the weekly payment plan option 412. Unlike the excerpt shown in FIG. 8 where the user selected weekly checkbox 402 is simply shown checked, the wizard view excerpt 410 of FIG. 10 displays further information in response to the user's selection. For example, in response to the user selection the weekly option 412, explanatory information 416 is displayed, as well as a field 418 in which the user provides the requested withdrawal start date.

As noted above, the rules for displaying such additional information, as well as the information to be displayed, may be defined in the document metadata and/or the supplemental metadata, depending on the particular implementation. For example, depending on the particular type of eForm employed, it may not be possible to define attributes or rules for the generated field 418 in the eForm definition and associated document metadata. In such an instance, the attributes for the field 418 may be defined in the supplemental metadata 224, which is assembled with the eForm definition 220 and extracted document metadata 222 when the user interface 252 is dynamically generated. For example, attributes for the input field 418 shown in FIG. 10 could include the size of the input box being generated, the date format (requiring it be populated with date information). Further, help text associated with the input field such as "month/day/year" may also be defined. Similarly, in other implementations other aspects of the underlying eForm document are modified or enhanced via the supplemental metadata 224 to improve the user experience, such as converting input fields defined by the eForm definition and/or document metadata to different types of input fields. For example, to simplify a user's data input process, input fields that are defined as check boxes or radio buttons in the eForm definition and associated document metadata may be converted to dropdown lists by the supplemental metadata. After receiving such user inputs, the supplemental metadata may further provide definitions for embedding the received information into the underlying eForm in the format required by the eForm.

The displayed eForms may be further supplemented with business rules that are provided in the document metadata or supplemental metadata as appropriate. For example, if a certain field is prefilled based on data stored in the SOR 210, a rule could be established to display the prefilled data and make the field read only because the prefilled data should not be changed. In some examples, such information is used to create an HTML form for the wizard display 410 that includes the logic and rules defined as described above.

Still further, certain form elements may be necessary to meet ADA requirements or other regulations associated with certain eForms. For example, some forms require that a user draw a circle around a desired choice, which is not convenient for online completion by the user. In some disclosed embodiments, the document metadata and/or supplemental metadata includes objects that indicate where circling or other objects are required. These objects then have additional metadata defined (typically in the supplemental metadata) which are interpreted by the document generation system 200 and/or the eDelivery and eSignature system 230 when the eForm display is generated. Among other things, this metadata instructs the system to represent the identified user choices within the PDF display or wizard display as either checkboxes or radio buttons, for example. Other metadata defines the size and placement offsets from the originally defined object within the PDF to ultimately define the circle object. When a user selects the identified checkbox or radio button, the user's choice is associated with the previously defined object and metadata so that the user selection is represented in the completed eForm by a circle object within the eForm at predefined locations and offsets.

Returning to FIG. 6, user input is received in block 340 via the selected user interface—ADA presentation 320, PDF display 326, or Wizard display 300—and added to the eFormIn bock 342, the completed eForm is displayed for the user, following an application of appropriate rules to the received inputs for verification. In some examples, various other user options are provided, such as allowing the user to save partially completed forms for completion at a later time. The user may then eSign the displayed eForm.

Disclosed embodiments of the document system thus may provide robust electronic data capture and eSign capabilities on forms, and eDelivery, eForm and eSignatures for selected documents.

The various embodiments described above are provided by way of illustration only and should not be construed to limiting. Those skilled in the art will readily recognize various modifications and changes that may be made to the embodiments described above without departing from the true spirit and scope of the disclosure or the following claims.

What is claimed is:

1. A document system, comprising:
   a first memory device storing an electronic form ("eForm") definition and document metadata;
   a second memory device storing supplemental metadata;
   a first processor programmed to:
   receive a document generation request for dynamically generating one or more documents associated with a loan application;
   retrieve from the first memory device the eForm definition and the document metadata for an eForm associated with the document generation request, the eForm definition and the document metadata defining a display structure of one or more user input fields of the one or more documents associated with the loan application, the display structure including one or more payment options for the loan application;
   retrieve from the second memory device the supplemental metadata for the eForm associated with the document generation request, the supplemental metadata including one or more rules for generating the one or more documents associated with the loan application, the one or more rules defining participant permissions, wherein participant permissions define which users have access rights to complete specific fields of the one or more documents;
   assemble the retrieved eForm definition, document metadata and supplemental metadata into the one or more documents, the eForm definition, document metadata and supplemental metadata defining, at assembly, content and the display structure including display characteristics of the one or more user input fields for the one or more documents;
   generate a user interface;
   receive a document display request via the user interface;
   in response to the document display request, dynamically generate an eForm display including using the assembled eForm definition, document metadata, and supplemental metadata to form the one or more documents of the loan application, the one or more documents of the eForm display including the one or more payment options for the loan application, and one or more rules defining the participant permissions;
   wherein the eForm display is dynamically generated based on one or more of: a product type of the loan application; product metadata of the loan application; and legal, compliance, or regulatory requirements for the loan application;
   wherein one or more user input fields in the one or more documents of the eForm display are prefilled based on available information without requiring user input; and
   wherein the document metadata or supplemental metadata includes a rule to control access rights of the prefilled user input field to prevent a user from changing the prefilled information.

2. The document system of claim 1, further comprising:
   a communications network, wherein the first processor is connected to the communications network;
   a second processor connected to the communications network to communicate with the first processor, the second processor being programmed to receive and display the user interface, wherein the eForm display is output to the user interface.

3. The document system of claim 1, wherein the supplemental metadata defines eForm input fields that are not included in the eForm definition or the document metadata.

4. The document system of claim 1, wherein the eForm definition includes form objects, form object attributes and the document metadata.

5. The document system of claim 1, wherein dynamically generating the eForm display includes dynamically generating HTML to generate the user interface.

6. The document system of claim 1, wherein the first processor is further programmed to add data tags to the eForm display.

7. The document system of claim 6, wherein the second processor is programmed to read the data tags for a visually impaired user.

* * * * *